Dec. 29, 1964  A. E. C. DENOVAN ETAL  3,163,002
PLASTIC ROCKET TUBE
Filed Sept. 4, 1953
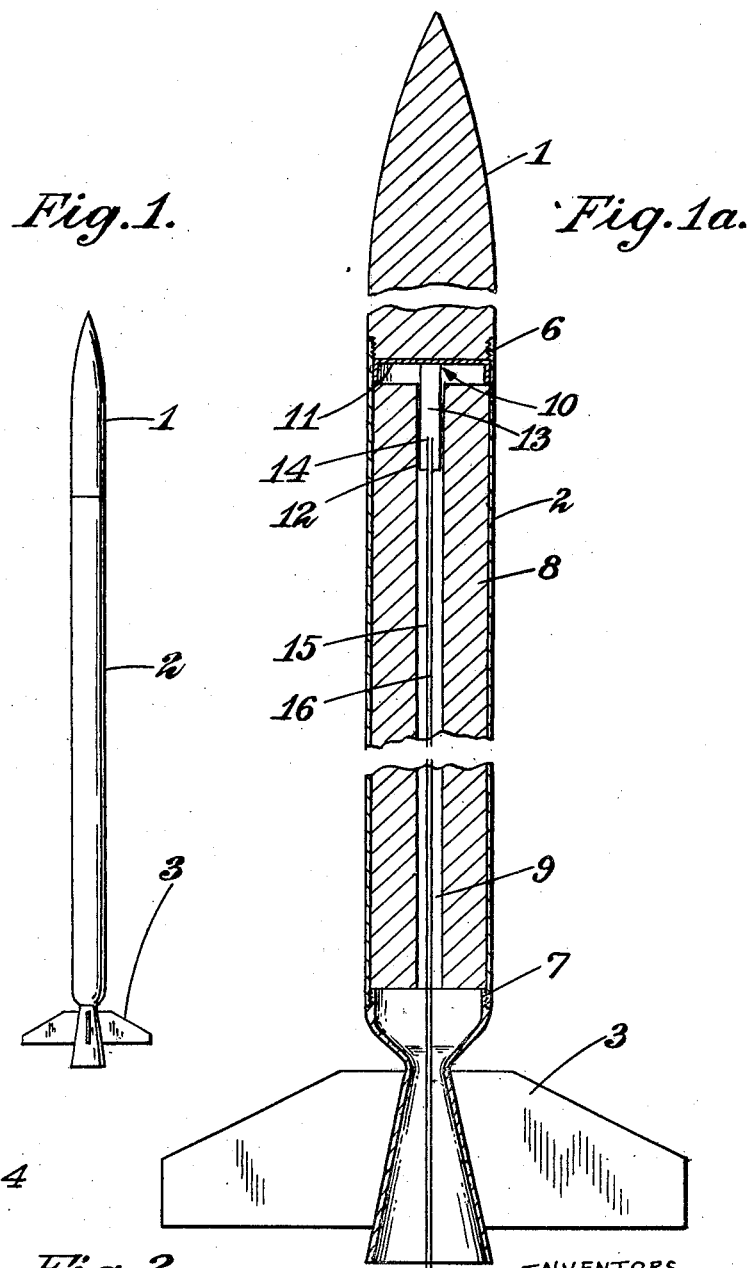
INVENTORS
Alexander E. C. Denovan
Dennis J. Hodgson
Henry Kremer
By Watson, Cole, Grindle, & Watson
ATTORNEYS United States Patent Office 3,163,002
Patented Dec. 29, 1964

3,163,002
PLASTIC ROCKET TUBE
Alexander Ewing Crawford Denovan, 2 Dovercourt Gardens, Stanmore, England; Dennis James Hodgson, 12 Anthony Close, Oxhey, England; and Henry Kremer, 35 Stormont Road, Highgate, London, England
Filed Sept. 4, 1953, Ser. No. 378,516
Claims priority, application Great Britain, Sept. 8, 1952, 22,567/52
6 Claims. (Cl. 60—35.6)

This invention is for improvements in or relating to plastic materials and has particular reference to reinforced plastic materials and their employment in the manufacture of pressure-containing vessels.

It is an object of the invention to provide a reinforced plastic material which has tensile characteristics greater than those of steel on a weight for weight basis and which is relatively light, easily worked and fabricated and can be used for purposes for which high grade steel has previously been employed particularly the manufacture of pressure vessels.

According to the present invention a pressure vessel having high tensile properties is made of a synthetic resin as hereinafter defined having affinity for glass fiber and having incorporated therein as a reinforcing agent glass fibers or a material comprising glass fibers. The glass fibers may be either randomly distributed or may be directionally arranged. Alternatively, the synthetic resin may be reinforced with a web of glass fibers or with a woven cloth of glass fibers.

By "a synthetic resin having affinity for glass fiber" is meant a resin which is chemically and physically adapted to produce in conjunction with glass fibers a substantially rigid material of suitable properties, such as for example good fiber adhesion and good compressive strength. Such resins are inter alia the polyester resins, suitably adapted phenolic resins and melamine resins.

The suitability of any particular resin for use in the present invention may be determined by impregnating a web or cloth of glass fibers (which may previously have been treated or finished in known manner) with the resin in liquid form or with a solution of the resin and then forming the impregnated web or fabric into a laminated product under a pressure of the order of 10 lbs. per square inch, curing the resin and examining the product e.g. with regard to its adhesive and tensile strengths as compared with those of a known good laminate, for example one made by the impregnation of glass web or fabric with a polyester resin. Laminated products having physical properties of the order of those of laminates prepared by the use of a polyester resin particularly with respect to interlaminar adhesion are suitable for use in the present invention.

Among the phenolic resins which may be employed may be mentioned alkaline heat-setting phenol formaldehyde stage B resins in solution in industrial methylated spirit.

Reinforced polyester plastics made in accordance with the present invention may be used with advantage in the manufacture of pressure-containing vessels and in particular for tubular pressure-containing vessels which are to resist extremely high pressures for which high grade steel is normally required and are also capable of resisting momentarily high temperatures such as are generated by the explosion of an explosive charge.

The invention may be applied for example to the production of the casings of projectiles, e.g. self-propelled projectiles such as rocket projectiles.

When employed for the manufacture of pressure-resisting vessels of the kind referred to above, glass fibers, e.g. in the form of a web or a fabric may have been treated, i.e. "finished," by means well known in the glass fiber art. Thus, the glass web or fabric may be treated with a material known under the registered trade mark "Volan." The treated fabric may then be dipped in the ester or other resin while the latter is in the liquid state and the web or fabric may then be wound upon a core in order to build up a vessel having the necessary thickness of wall. When using a phenolic resin a suitable method is to preimpregnate a glass fiber cloth with the desired content of phenolic resin and then substantially to dry the cloth to a handleable state. The impregnated cloth is then wound upon a core under tension and the curing of the resin accomplished at an elevated temperature, e.g. at 130° C. Metal inserts may be embodied in the structure as required and the thickness of the wall may be varied from point to point according to requirements. Thus, in the production of a rocket projectile the forward end of the rocket tube may be fitted with a threaded metal ring for the attachment of a war head and the rear end may be constricted to a throat or throats and may be flared in accordance with normal rocket venturi practice. The throat or throats may be provided with a lining e.g. a metal or other heat resisting lining. Preferably such linings may be of plastic material e.g. of asbestos-reinforced plastic material and may be moulded in situ with the tube.

The accompanying diagrammatic drawing shows two forms of apparatus constructed in accordance with the present invention.

FIGURE 1 shows a rocket projectile with the normal war head 1, rocket tube 2 and tail assembly 3.

FIGURE 1a is a central vertical section on a larger scale of the rocket projectile shown in FIGURE 1.

The war head 1 is attached to the rocket tube (generally referred to in FIGURE 1 as 2) by being screwed into the tubular pressure vessel 2 internally threaded at 6. The tail assembly 3 is similarly attached to the other end of the pressure vessel 2 by screwthreads 7. The pressure vessel 2 contains a charge 8 of propellant explosive which is provided with an axial throughway 9. The end of the charge nearer the war head contains a device 10 for initiating the explosion of the charge 8. This consists of a circular plate 11 having a cartridge 12 centrally attached to it. The cartridge contains the initiator 13 in which is embedded an electrical firing device 14 which is connected by leads 15 and 16 passing through the center of the main charge 8 to switching means and a source of current outside the rocket.

FIGURE 2 shows a cylindrical round ended vessel for the storage of gas under pressure, the open end of the vessel being provided with an internally screwed metal ring for connecting a valve to the vessel.

We claim:

1. A rocket tube having high tensile properties which tube is made of a thermosetting plastic having an affinity for glass fiber and having glass fibers incorporated therein as a reinforcing agent, said tube being cylindrical and having a constricted throat at one end thereof lined with a heat resisting plastic.

2. A rocket tube as claimed in claim 1 wherein the plastic is a polyester resin.

3. A rocket tube as claimed in claim 1 wherein the reinforcing agent consists of glass fibers in the form of woven cloth.

4. A rocket tube formed with a constricted throat at one end thereof, said tube being made of a thermosetting plastic having an affinity for glass fiber and having glass fibers incorporated therein as a reinforcing agent, the throat of said tube being provided with a heat resistant lining.

5. A rocket tube as claimed in claim 4, wherein the heat resistant lining is of asbestos-reinforced thermosetting plastic.

6. A rocket tube as claimed in claim 5 wherein the asbestos reinforced thermosetting plastic is moulded in situ with the tube.

References Cited in the file of this patent

UNITED STATES PATENTS

| | | |
|---|---|---|
| 1,233,801 | O'Malley | July 17, 1917 |
| 2,477,852 | Bacon | Aug. 2, 1949 |
| 2,500,334 | Zucrow | Mar. 14, 1950 |
| 2,503,271 | Hickman | Apr. 11, 1950 |
| 2,504,421 | Johnson et al. | Apr. 18, 1950 |
| 2,589,008 | Lannan | Mar. 11, 1952 |
| 2,594,693 | Smith | Apr. 29, 1952 |
| 2,594,838 | Alexander et al. | Apr. 29, 1952 |
| 2,658,332 | Nicholson | Nov. 10, 1953 |
| 2,744,043 | Ramberg | May 1, 1956 |

FOREIGN PATENTS

| | | |
|---|---|---|
| 552,437 | Great Britain | Apr. 7, 1943 |

OTHER REFERENCES

Bifeld et al.: reprint from August 18, 1952, issue of American Dyestuff Reporter.